(12) United States Patent
Khairmode et al.

(10) Patent No.: US 9,877,184 B2
(45) Date of Patent: Jan. 23, 2018

(54) METHOD OF MANAGING MULTIPLE SUBSCRIPTION AND USER IDENTITIES IN MULTI-SIM USER DEVICES

(71) Applicant: Samsung Electronics Co., Ltd., Gyeonggi-do (KR)

(72) Inventors: Vijay Shankar Khairmode, Bangalore (IN); Diwakar Sharma, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/211,606

(22) Filed: Jul. 15, 2016

(65) Prior Publication Data
US 2017/0156050 A1 Jun. 1, 2017

(30) Foreign Application Priority Data
Nov. 30, 2015 (IN) .......................... 6427/CHE/2015

(51) Int. Cl.
*H04W 4/00* (2009.01)
*H04W 8/18* (2009.01)
(Continued)

(52) U.S. Cl.
CPC ............ *H04W 8/183* (2013.01); *H04M 3/02* (2013.01); *H04M 3/42042* (2013.01); *H04W 76/027* (2013.01)

(58) Field of Classification Search
CPC . H04W 8/183; H04W 76/027; H04W 60/005; H04W 60/00; H04W 36/14; H04W 76/025; H04W 76/02; H04W 76/028; H04W 88/06; H04W 8/18; H04W 8/04; H04M 3/02; H04M 3/42042; H04M 1/57; H04M 3/42; H04M 11/00; H04N 1/00; H04N 1/32
(Continued)

(56) References Cited

U.S. PATENT DOCUMENTS 7,634,269 B2 * 12/2009 Gallagher ............. H04W 16/16
370/331
8,027,335 B2 * 9/2011 Ansari ................ H04L 12/2803
370/353
(Continued)

FOREIGN PATENT DOCUMENTS

EP 1220558 A1 * 7/2002 .............. H04W 4/16
EP 1220558 B1 * 5/2004 .............. H04W 4/16
(Continued)

*Primary Examiner* — Mahendra Patel
(74) *Attorney, Agent, or Firm* — The Farrell Law Firm, P.C.

(57) ABSTRACT

Apparatuses, systems, and methods to avoid contact/identity disclosure when using a multiple subscriber identity module (multi-SIM) wireless electronic device are described. According to one method, if a call to a first party in a first SIM cannot be established using the first SIM, the call is established using a second SIM, but without the device displaying identity/contact information of the first SIM. According to the embodiment, the calling line identification restriction (CLIR) supplementary service may be used, a user-to-user signalling (UUS) service may be invoked, and/or the user may decide to share selected identity/contact information associated with the first SIM while withholding the rest from the device.

20 Claims, 10 Drawing Sheets

(51) Int. Cl.
*H04W 76/02* (2009.01)
*H04M 3/42* (2006.01)
*H04M 3/02* (2006.01)

(58) Field of Classification Search
USPC ..... 455/435.2, 558, 410, 445, 411; 370/328, 370/352; 726/6
See application file for complete search history.

(56) References Cited

U.S. PATENT DOCUMENTS

| | | | | |
|---|---|---|---|---|
| 8,140,071 B2* | 3/2012 | Tak | ................... | H04M 1/72519 455/433 |
| 2002/0115441 A1* | 8/2002 | Alonso | ................... | H04W 4/16 455/445 |
| 2006/0172734 A1* | 8/2006 | Tak | ................... | H04M 1/72519 455/433 |
| 2011/0059738 A1* | 3/2011 | Waller | ................... | H04W 8/26 455/433 |
| 2013/0310035 A1* | 11/2013 | Gouriou | ............... | H04W 60/005 455/435.1 |
| 2015/0327207 A1* | 11/2015 | Bharadwaj | ............. | H04W 8/04 455/435.2 |
| 2016/0183238 A1* | 6/2016 | Buthler | ................ | H04W 72/048 370/329 |
| 2016/0337845 A1* | 11/2016 | Noldus | ................... | H04W 8/06 |

FOREIGN PATENT DOCUMENTS

| | | | | | |
|---|---|---|---|---|---|
| GB | 2391750 B | * | 1/2006 | ............... | H04M 1/57 |
| JP | 10257158 A | * | 9/1998 | ........ | H04N 1/32058 |
| KR | 20110059738 A | * | 6/2011 | ........ | H04W 72/0406 |

* cited by examiner

METHOD OF MANAGING MULTIPLE SUBSCRIPTION AND USER IDENTITIES IN MULTI-SIM USER DEVICES

PRIORITY

This application claims priority under 35 U.S.C. § 119(a) to an Indian Complete Patent Application filed on Nov. 30, 2015 in the Indian Intellectual Property Office and assigned Serial No. 6427/CHE/2015 (CS), the entire contents of which are incorporated herein by reference.

BACKGROUND

1. Field of the Disclosure

The present disclosure relates generally to devices and methods for management of multiple subscriber identities (e.g., multiple subscriber identity modules (multi-SIMs)) in a terminal of a cellular telecommunication network. The disclosure relates more specifically to management of multiple subscriber identity modules for devices capable of communicating using two or more subscriber identities with different group of persons while revealing only a specific SIM/contact number to each group.

2. Description of the Related Art

Wireless communication systems provide various types of communication content such as, for example, voice, data, and so on. Wireless multiple-access communication systems support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices communicate with other mobile devices in peer-to-peer wireless network configurations.

Using a dual SIM or multi SIM phone, the user can manage different SIMs for different group of people. Here, one group of people in a contact list of phone can be associated with one SIM contact number while another group of people can be associated with another SIM contact number. A person belonging to one specific group may know only the SIM contact number with which that specific group is associated while being unaware of the other SIM contact number of the user. The user may desire to use only the SIM contact number associated with a group to communicate with a person in that group and hide the other SIM contact number associated with one or more other groups. It is also possible to have a person be a member in multiple groups and thus be aware of multiple SIM contact numbers of the user associated with the various groups.

For example, a user may group all the people from the user's office as "Office Colleagues" and all the people who are the user's family and friends as "Personal Contacts". The user of the dual SIM phone assigns SIM1 mobile station international subscriber directory number #1 (MSISDN1) as the user's own identity for communicating with people in "Personal Contacts" and SIM2 MSISDN2 as the user's identity for communicating with people in "Office Colleagues". The user prefers not to share SIM1 MSISDN1 with office colleagues and likewise prefers not to share SIM2 MSISDN2 with personal contacts unless they are also part of "Office Colleagues" group. The user may share his multiple identities or contact numbers with people who belong to multiple groups.

However with the current design or state of the art, there are cases where the user of a multi-SIM phone is forced to use a SIM contact number associated with one group to communicate with a person associated with another group. In such cases, the user may be forced to divulge the user's SIM/contact/MSISDN used to communicate with one group to a member of another group with which the user uses a different SIM/contact/MSISDN.

As an example, the user's phone may go out of network coverage for SIM1 (MSISDN1) associated with group 1 of contacts and the user needs to reach one of the contacts in group 1. Because the network coverage for SIM2 (MSISDN2) is available, the user uses SIM2 to dial the contact number in group 1. As a result, the person in group 1 gets to know the user's SIM2 (MSISDN2) for group 2 because the user used it in order to call the person in group 1. Similarly, the user may run out of the balance on a pre-paid connection with the network of SIM1 (MSISDN1), thereby requiring the user to use the network of SIM2 (MSISDN2) to make a call with a person in group 1. Once again, the person in group 1 gets to know the user's SIM2 (MSISDN2) intended for group 2.

As another example, the network of SIM1 (MSISDN1) has no circuit-switched (CS) service and the user needs to reach one of the contacts in group 1. Because the network coverage and CS service for SIM2 (MSISDN2) are available, the user uses SIM2 to dial the contact number of group 1. But, by receiving the call, the person in group 1 gets to know the user's SIM2 (MSISDN2) intended for members of group 2. Similarly, if the network rejected the registration or location update of SIM1 (MSISDN1) and the user needed to reach one of the contacts in group 1 and assuming the SIM2 (MSISDN2) is successfully registered with its network, the user would use SIM2 to dial the contact number of the person of group 1, who would thereby know the user's SIM2 (MSISDN2) for group 2.

As yet another example, a user of a dual SIM dual standby (DSDS) phone is using SIM2 (MSISDN2) to talk to a person in group 2 associated with SIM2 (MSISDN2). Suppose the user wants to put the call on hold and check something with a person in group 1 associated with SIM1. As this is a DSDS phone, the SIM1 (MSISDN1) protocol stack is inactive because the user cannot use both SIMs simultaneously to make calls. Hence the user holds the SIM2 (MSISDN2) call and dials the person from group 1, who thereby gets to know the user's SIM2 (MSISDN2) for group 2.

If the user of a DSDS phone wants to have a conference call with two people, one from group 1 and another from group 2, only one SIM/protocol stack can be used to communicate with both. One of the user's SIMs (MSISDNs) for one group is thus exposed to a person from another group.

All of the above cases involving DSDS phones apply to dual SIM dual active phones as well where Protocol Stack1/Radio 1 serves SIM1 exclusively and Protocol Stack2/Radio 2 serves SIM2 exclusively.

When using a DSDS phone, the user forwards the calls from SIM1 (MSISDN1) to SIM2 (MSISDN2) before starting a call on SIM2 (MSISDN2). This is because once the user starts the call on SIM2 (MSISDN2), the SIM1/protocol stack1 gets suspended as there is only a single radio in a DSDS mobile phone. If a person in group 1 calls the user in such a case and the person has Connected Line Identity Presentation (COLP) facility enabled then that person gets to know the SIM2/MSISDN2 of the user during establishment of the forwarded call.

FIG. 1 is a schematic diagram illustrating a "context contamination", "contact disclosure", or "contact exposure" scenario in a dual SIM phone. In FIG. 1, the user has a dual SIM phone 102, in which a first user group of personal contacts are stored in a first SIM and a second user group of work contacts are stored in a second SIM. The user of dual SIM phone 102 is unable to contact phone 104 of a contact from the work group with the second SIM and instead makes use of the first SIM which is meant only for the user's personal contacts. In such a case, there may be a contact exposure where the personal details of the user of dual 102 may be compromised and these personal details may be revealed to the work group against the user's desire. The personal details include the name of the user and the phone number of the user meant only for personal contacts.

FIG. 2 is a flow chart illustrating a procedure for managing multiple subscriber identities in a multi-SIM device when there is a mobile originating (MO) call. At step 202, the user dials a number from first user group in the contact list. At step 204, it is checked whether the call is possible with the first SIM or not. If yes, then at step 206, the call is established using the first SIM. If the call from first SIM is not possible in step 204, then at step 208, it is checked whether the call is possible with the second SIM. If the call is not possible with the second SIM, then at step 212, the call fails. If the call is possible with the second SIM in step 208, then at step 210, the call is established using the second SIM but the second SIM calling line ID of the user is also displayed on the device of called party (who is in the first group and not the second group).

FIG. 3 is a flow chart illustrating a procedure for managing multiple subscriber identities in a multi-SIM device when either is a mobile terminating (MT) call. At step 302, the user dials a number from second user group in the contact list using the second SIM. At step 304, all the calls for the first SIM are forwarded to the second SIM, assuming a DSDS phone is being used and there is only a single radio. Further at step 306, the call using the second SIM is established. At step 308, a person/party from the first user group calls the user on the first SIM while the user is already on the call using second SIM. At step 310, the user gets a waiting tone indicating another call has arrived while the user is already on the call established using the second SIM. At step 312, the user puts the call established using the second SIM on hold and receives the call from the calling party of the first user group. At step 314, the second SIM identity of the user is displayed on the device of the calling party from the first user group.

In view of the foregoing, there exists a need for methods, apparatuses, and systems which enable the user of a multi-SIM phone to hide one or more contact numbers from one or more specific groups of people.

SUMMARY

According to an aspect of the present disclosure, a method for managing multiple subscriber identities in a multi-subscriber identity module (multi-SIM) device is provided, which includes initiating, by a mobile terminal comprising the multi-SIM device, a call to a first party of a first user group stored in a first SIM of the multi-SIM device; checking, by the mobile terminal, if the call can be established using the first SIM or not; if the call cannot be established using the first SIM, invoking, by the mobile terminal, a calling line identification restriction (CLIR) supplementary service for a second SIM of the multi-SIM device; and establishing, by the mobile terminal, the call using the second SIM, wherein a calling line identity (ID) of the second SIM is not displayed on the mobile terminal.

According to an aspect of the present disclosure, a multi-subscriber identity module (multi-SIM) wireless communication device is provided, which includes a plurality of SIMs, including a first SIM and a second SIM; a processor; and a non-transitory machine-readable memory adapted to store instructions which when executed by the processor cause the device to: initiate a call to a first party of a first user group stored in the first SIM; check if a call can be established using the first SIM or not; if the call cannot be established using the first SIM, invoke a calling line identification restriction (CLIR) supplementary service for the second SIM; and establish the call using the second SIM, wherein a calling line identity (ID) of the second SIM is not displayed on the device.

According to an aspect of the present disclosure, a wireless communication device is provided, which includes a plurality of slots, each capable of receiving a Subscriber Identity Module (SIM); a processor; and a non-transitory machine-readable memory which stores instructions which when executed by the processor cause the device to: initiate a call to a first party stored in a first SIM inserted into a slot; check if a call can be established using the first SIM or not; if the call cannot be established using the first SIM, invoke a calling line identification restriction (CLIR) supplementary service for a second SIM inserted into another slot; and establish the call using the second SIM, wherein the calling line identity of the second SIM is not displayed on the device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

In the following detailed description of the embodiments of the present disclosure, reference is made to the accompanying drawings that form a part hereof, and in which are shown by way of illustration specific embodiments in which the disclosure is practiced. These embodiments are described in sufficient detail to enable those skilled in the art to practice the present disclosure, and it is to be understood that other embodiments may be utilized and that changes may be made without departing from the scope of the present disclosure. The following detailed description is, therefore, not intended to be limiting in any sense, and the scope of the present disclosure is defined only by the appended claims.

The specification may refer to "an", "one" or "some" embodiment(s) in several locations. This does not necessarily imply that each such reference is to the same embodiment(s), or that any feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of listed features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having meanings that are consistent with their meaning in the context of the relevant art and should not be interpreted in an idealized and/or overly formal sense unless expressly so defined herein.

The various embodiments of the present disclosure disclose apparatuses, systems, and methods for preventing contact disclosure, which may also be referred to herein as context contamination or contact exposure, in a dual SIM/multi-SIM mobile device, such as, for example, a User Equipment (UE). In embodiments of the present disclosure, the mobile device can be any mobile electronic gadget that a user can use for communication, including, but not limited to, mobile phones, personal digital assistants (PDAs), tablets, and the like. The embodiments of the present disclosure are described below with respect to mobile phones, but these examples do not limit the scope of the present disclosure.

Figure 1:
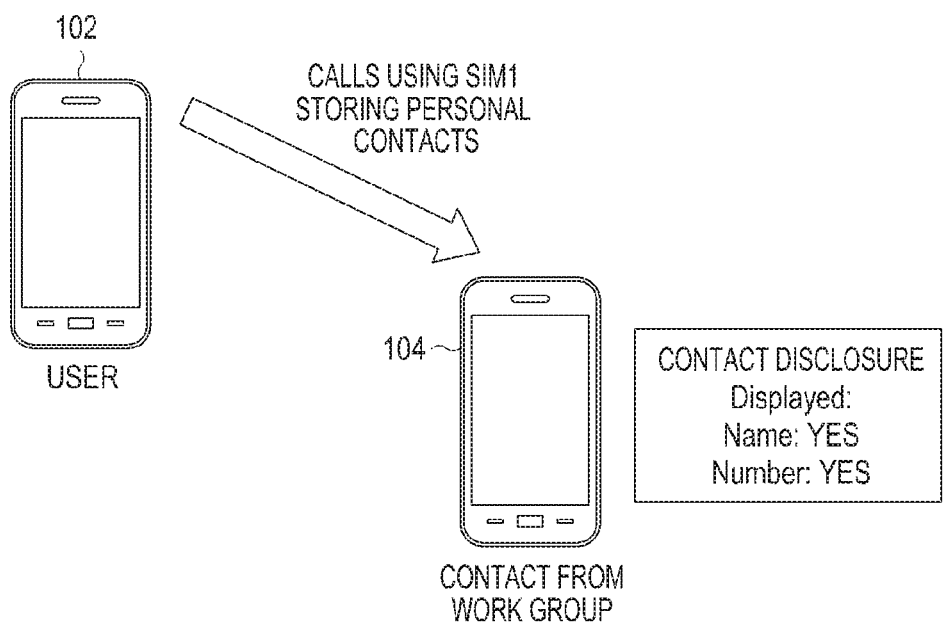
FIG. 1 is a schematic diagram illustrating an example of a contact exposure by a dual SIM phone.
Figure 2:
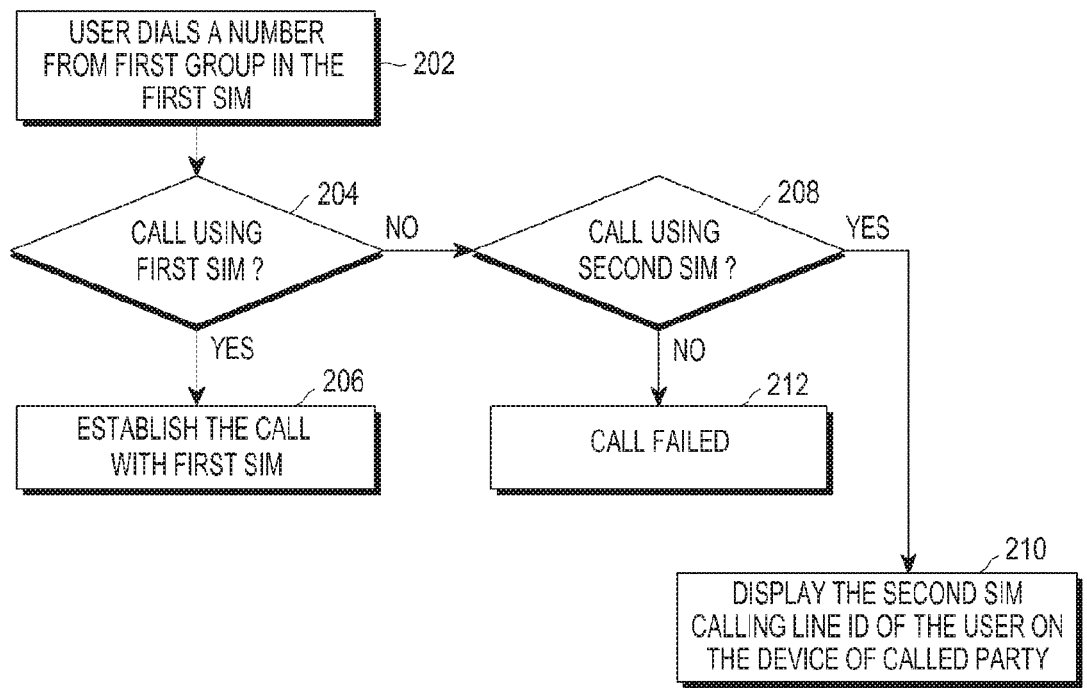
FIG. 2 is a flow chart illustrating a procedure for managing multiple subscriber identities in a multi-SIM device when making a mobile originating (MO) call.
Figure 3:
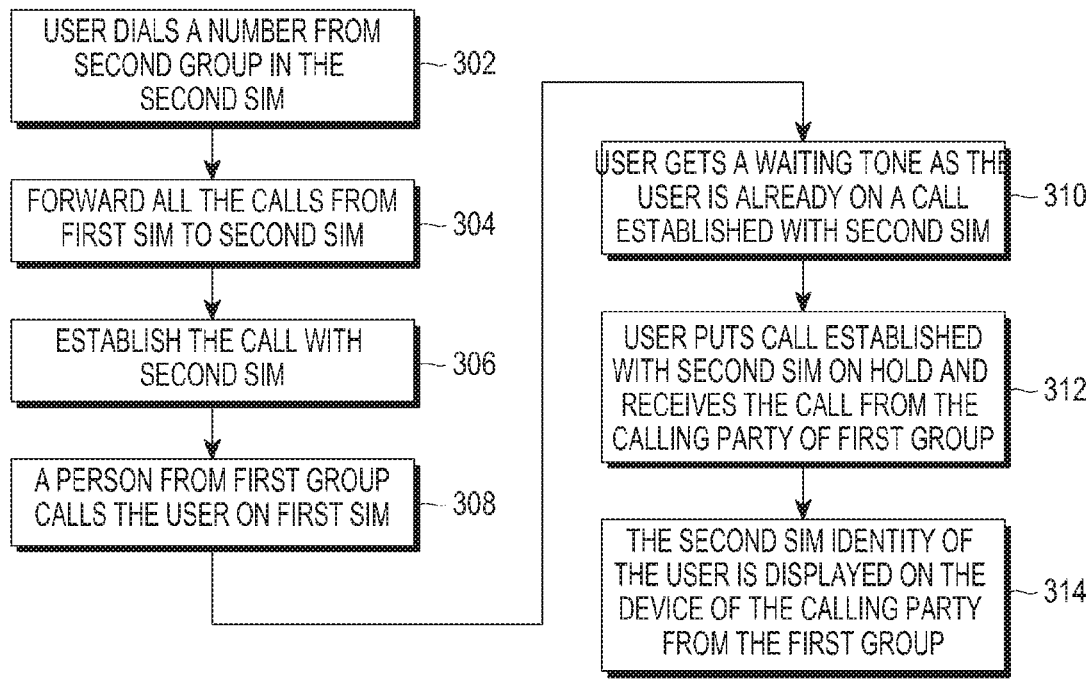
FIG. 3 is a flow chart illustrating a procedure for managing multiple subscriber identities in a multi-SIM device where making a mobile terminating (MT) call.
Figure 4:
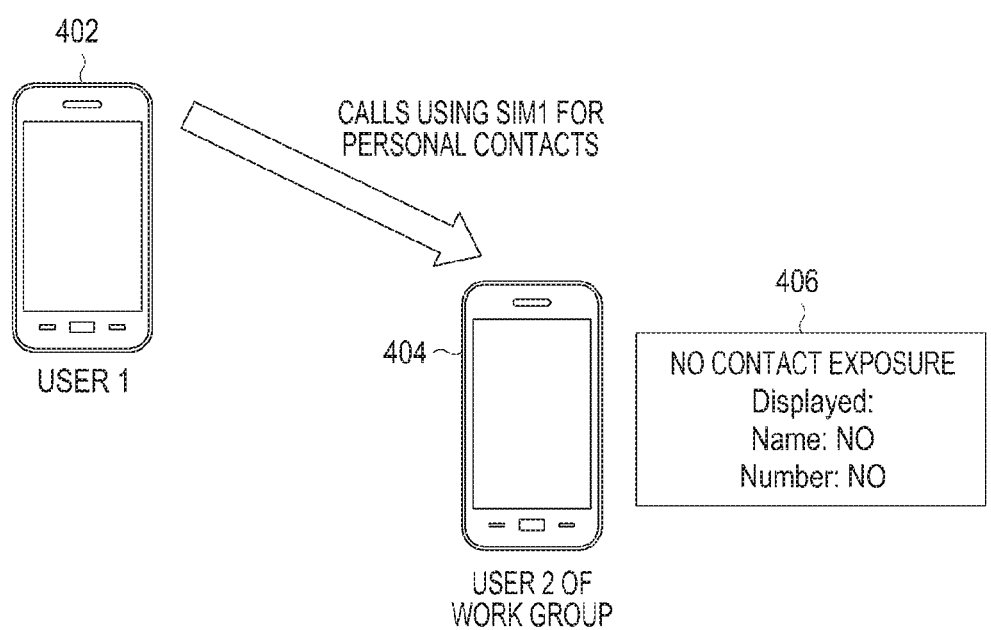
FIG. 4 is schematic diagram illustrating how contact disclosure is avoided in a dual SIM phone, according to an embodiment of the present disclosure.

FIG. 4 is schematic diagram illustrating how contact disclosure is avoided in a dual SIM phone, according to an embodiment of the present disclosure. In FIG. 4, user1 has dual SIM phone 402, in which a first user group of personal contacts is stored in a first SIM and a second user group of work contacts is stored in a second SIM. Because user1 is unable to contact mobile phone 404 of user2 from a work group using the second SIM in dual SIM phone 402, the first SIM meant only for the user's personal contacts is used to call user2 of the work group. According to the present disclosure, the user's name and number are hidden from the user2 by not being displayed on mobile phone 404 as represented in 406. In such a case, there may be no contact disclosure where the personal details of user1's first SIM/contact/identity in the dual SIM phone 402 is compromised.

Figure 5:
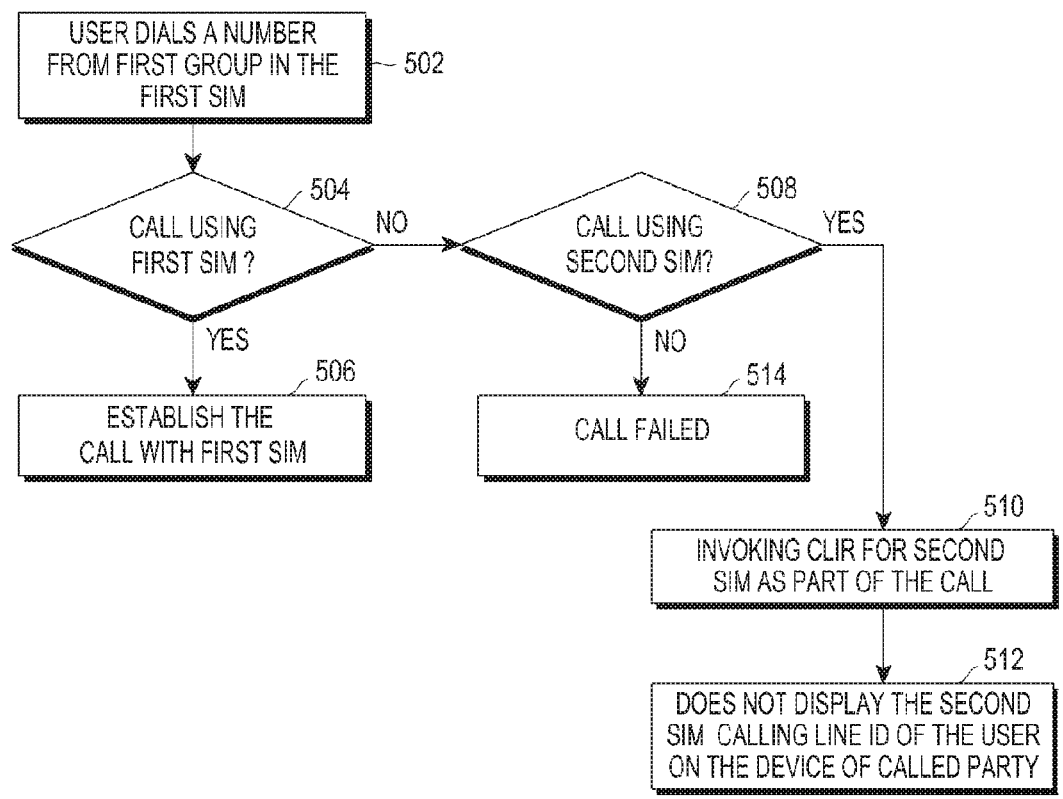
FIG. 5 is a flow chart illustrating a procedure for managing multiple subscriber identities in a multi-SIM device when making an MO call, according to an embodiment of the present disclosure.

FIG. 5 is a flow chart illustrating a procedure for managing multiple subscriber identities in a multi-SIM device when making a mobile originating (MO) call, according to an embodiment of the present disclosure. At step 502, the user dials a number of a party from the first user group stored in the first SIM. At step 504, the dual SIM phone checks if establishing the call is possible with the first SIM. If yes, then at step 506, the dual SIM phone establishes the call with first SIM. If the call using the first SIM is not possible, then at step 508, the dual SIM phone checks if establishing the call is possible with the second SIM. If the call is possible with the second SIM, then at step 510, the dual SIM phone can invoke, as part of the call, the calling line identification restriction (CLIR) supplementary service for the second SIM. At step 512, once the CLIR is invoked, the call with the second SIM can be established, but the second SIM calling line ID of the user is not displayed on the device of the called party. If the call is not possible with the second SIM, then at step 514, the call fails.

According to an embodiment herein, in the event when user initiates a call but call cannot be served using associated SIM/MSISDN, the CLIR (calling line ID restriction) supplementary service is invoked/activated for one of the non-associated SIM/MSISDNs and the same SIM/MSISDN is used to serve the call. Invoking or enabling of CLIR service can be done by the mobile terminal by prefixing specific code before the dialed digits or by any NW operator specific method. The prefix code can be network operator and/or country dependent. The feature of caller ID suppression or Calling Line Identification Restriction (CLIR) enables the caller to prevent their telephone number from being communicated to the recipient when placing a call. In this way it is not possible to identify the caller by their telephone number, even if the telephone and connection of the call recipient are equipped with a Calling Line Identification Presentation (CLIP) function. The CLIR can be activated or deactivated on a call-by-call basis or in general for all calls. Here the CLIR service is invoked either by prefixing a code string to dialed digits or based on network operator specifications.

Figure 6:
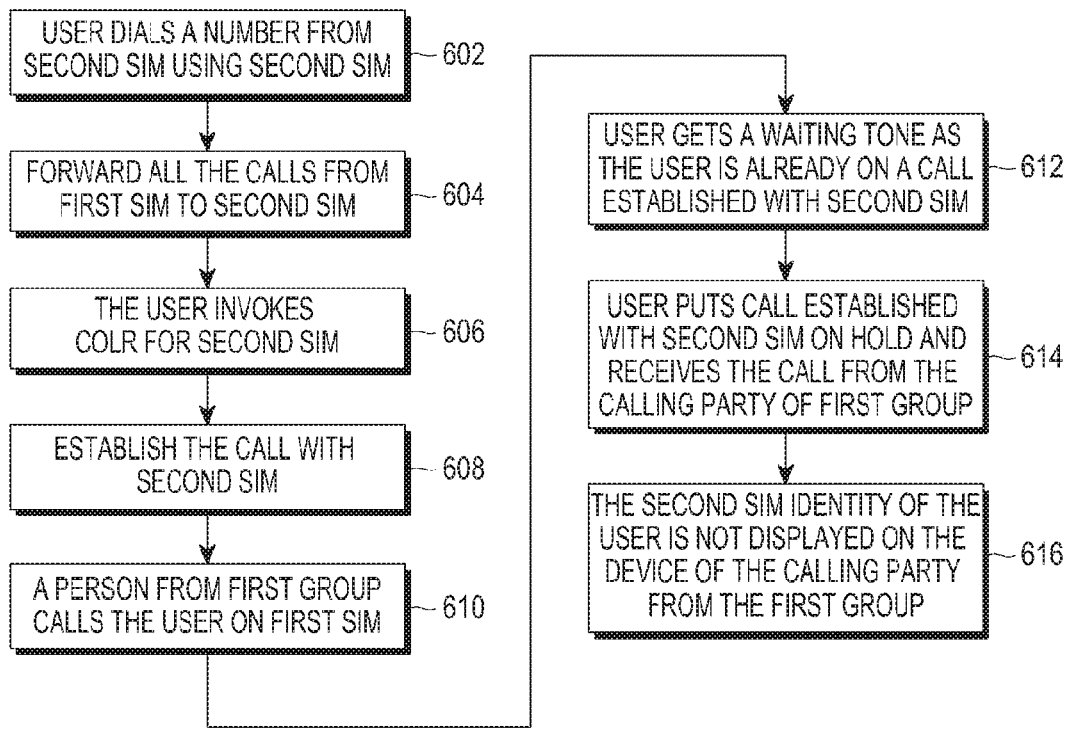
FIG. 6 is a flow chart illustrating a procedure for managing multiple subscriber identities in a multi-SIM device when making an MT call, according to an embodiment of the present disclosure.

FIG. 6 is a flow chart illustrating a procedure for managing multiple subscriber identities in a multi-SIM device when making a mobile terminating (MT) call, according to an embodiment of the present disclosure. At step 602, the user dials a number from the second user group stored in the second SIM using the second SIM. At step 604, all the calls for the first SIM are forwarded to the second SIM, assuming a DSDS phone is being used and there is only a single radio. At step 606, the user invokes connected line identification restriction (COLR) for the second SIM and, at step 608, the call using the second SIM is established.

According to an embodiment herein, when COLR is activated, the network prevents address information of the called party to be presented to the calling party. Here invoking or enabling of CLOR service can be done by the mobile terminal by using a specific code specified by the network operator or by any NW operator specific method.

The COLR service can be provided to the users in either permanent or temporary mode:
  Permanent mode: Usually provided to the called user on a subscription basis. Prevents the called user's address information from being presented to calling users.
  Temporary mode: May be provided to the called user on a subscription basis or may be generally available. Allows the called user to decide, on a call-by-call basis, whether to allow the calling user access to the called party address information. When subscribing, the user can specify a default behavior.

At step 610, a person/party from the first user group on the first SIM calls the user using the first SIM while the user is already on the call using the second SIM. At step 612, the user gets a waiting tone indicating another phone call has arrived while the user is already on the call established using the second SIM. At step 614, the user puts the call established with the second SIM on hold and receives the call from the calling person/party of first user group. At step 616, the second SIM identity of the user is not displayed on the device of the calling person/party from the first user group.

Figure 7:
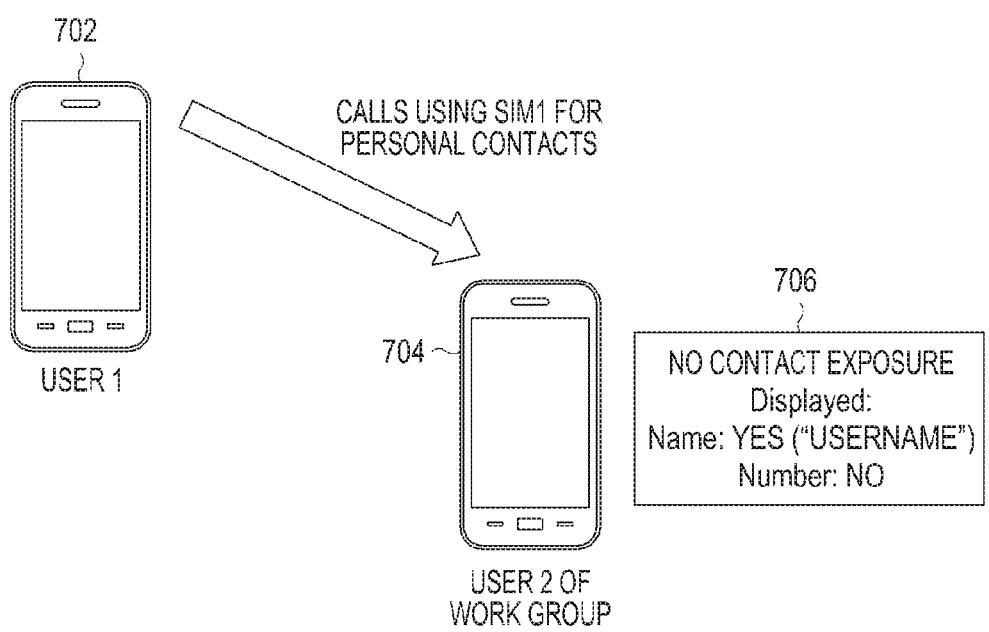
FIG. 7 is schematic diagram illustrating how only partial contact disclosure is made in a dual SIM phone, according to another embodiment of the present disclosure.

FIG. 7 is schematic diagram illustrating how only partial contact disclosure is made in a dual SIM phone, according to another embodiment of the present disclosure. According to the embodiment shown in FIG. 7, user1 has dual SIM phone 702, in which a first user group of personal contacts is stored in a first SIM and a second user group of work contacts is stored in a second SIM. Because user1's dual SIM phone 702 is unable to contact the mobile phone 704 of user2 from a work group using the second SIM, it makes use of the first SIM whose primary purpose is only for the user's personal contacts. According to this embodiment of the present disclosure, the user's name is displayed but the user's first SIM identity/contact/number is not displayed on user2's mobile phone 704 as represented in 706. In such a case, user1 can control the level of contact disclosure and only provide certain personal details.

Figure 8:
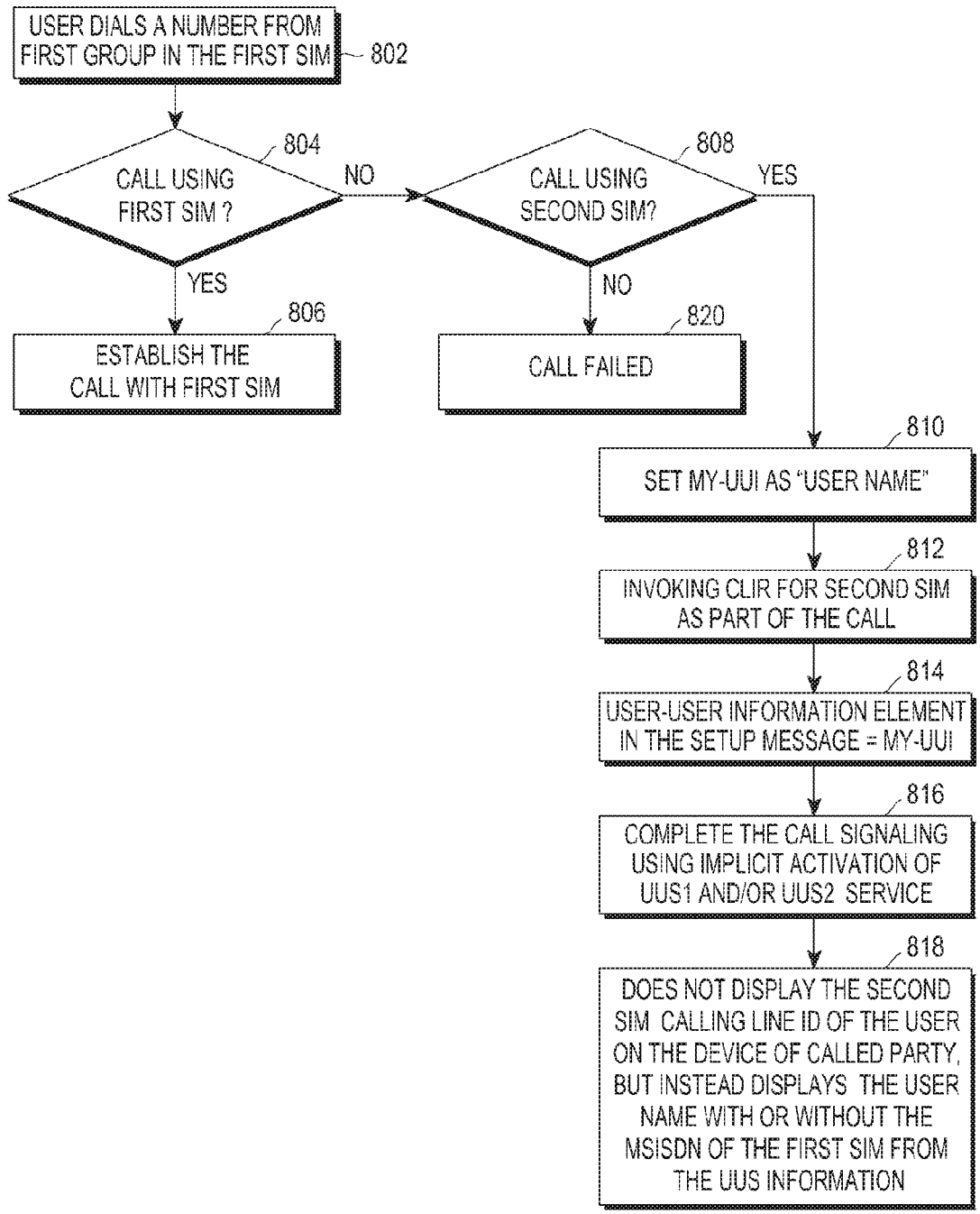
FIG. 8 is a flow chart illustrating a procedure for managing multiple subscriber identities in a multi-SIM device when making an MO call using user to user signaling (UUS), according to an embodiment of the present disclosure.

FIG. 8 is a flow chart illustrating a procedure for managing multiple subscriber identities in a multi-SIM device when making a mobile originating (MO) call using user to user signalling (UUS), according to an embodiment of the present disclosure. At step 802, the user dials a number of a person/party from first user group stored in the first SIM. At step 804, it is checked whether the call is possible using the first SIM. If yes, then at step 806, the call can be established using the first SIM. If the call from first SIM is not possible, then at step 808, it is checked whether the call can be established using the second SIM. If the call cannot be established through the second SIM, then at step 820, the call is terminated.

If the call is possible with the second SIM, then at step 810, the username of the user is assigned to the user-user information element (MY-UUI). At step 812, the calling line identification restriction (CLIR) supplementary service for the second SIM is invoked as part of the call. At step 814, once the CLIR is invoked, MY-UUI is assigned to the user-user information element in the setup message. At step 816, the call signalling is completed using the implicit activation of the UUS1 and/or UUS2 service. At step 818, the call with second SIM is established. When the call is established, the second SIM calling line ID of the user is not displayed on the device of the called party, but instead the username of the user and/or the MSISDN of the first SIM in User-to-User Signalling (UUS) information is displayed on the device of the called party. UUS is a supplementary service that enables a user to send/receive a limited amount of information to/from another user over the signalling channel in association with a call to the other user. The UUS is applicable to all circuit-switched telecommunications services.

Figure 9:
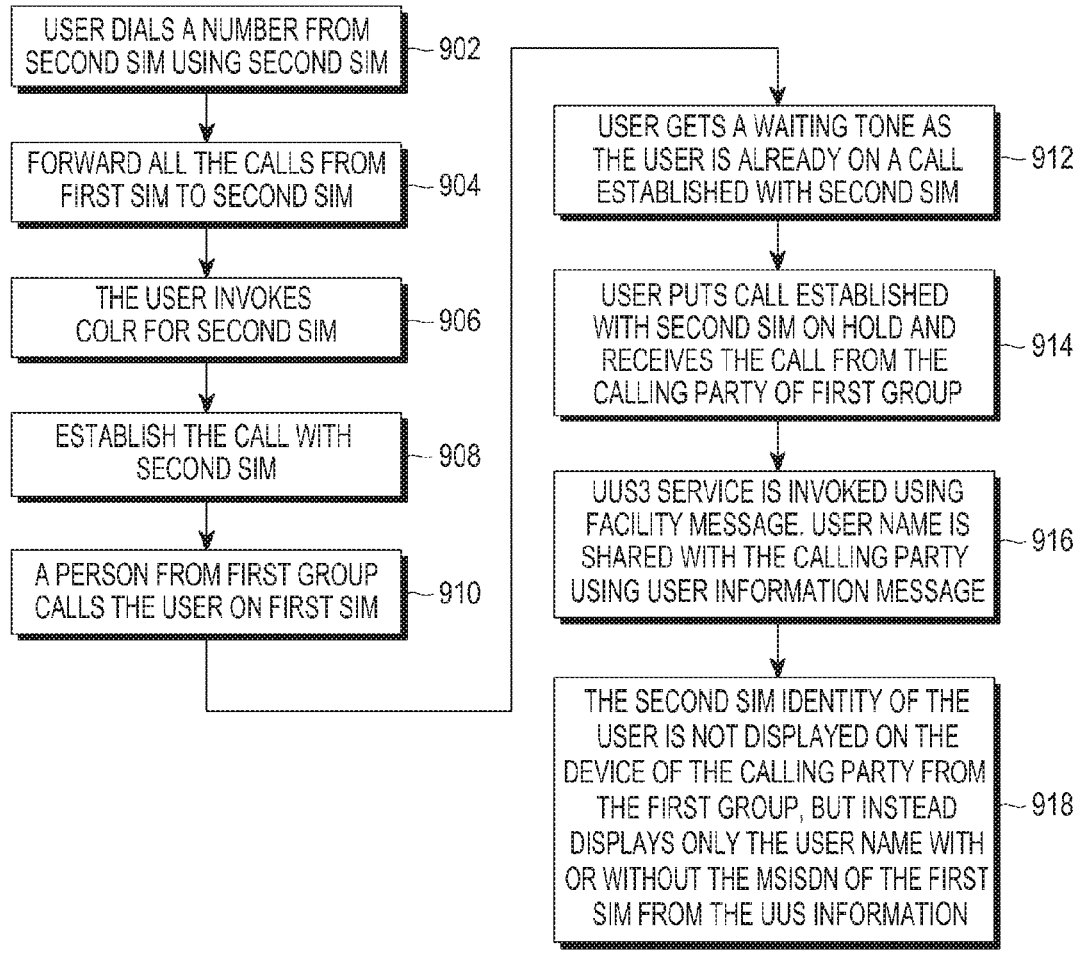
FIG. 9 is a flow chart illustrating a procedure for managing multiple subscriber identities in a multi-SIM device when making an MT call with UUS, according to an embodiment of the present disclosure.

FIG. 9 is a flow chart illustrating a procedure for managing multiple subscriber identities in a multi-SIM device when making a mobile terminating (MT) call with UUS, according to an embodiment of the present disclosure. At step 902, the user dials a number from second user group stored in the second SIM using the second SIM. At step 904, all the calls for the first SIM are forwarded to the second SIM, assuming a DSDS phone is being used and there is only a single radio. At step 906, the user invokes connected line identification restriction (COLR) for the second SIM and, at step 908, the call is established using the second SIM.

At step 910, a person/party from the first user group calls the user on the first SIM while the user is on the call using the second SIM. At step 912, the user gets a waiting tone indicating another phone call has arrived during the call established using the second SIM. At step 914, the user puts the call established with the second SIM on hold and receives the call from the calling person/party of first user group. At step 916, the second SIM invokes the UUS2 service using the facility message. The username of the user is shared with the calling party using a user information message. At step 918, the second SIM identity of the user is not displayed on the device of the calling party from the first user group, but instead the username of the user and/or the MSISDN of the first SIM in the UUS information is displayed on the device of the calling party from the first user group.

Figure 10:
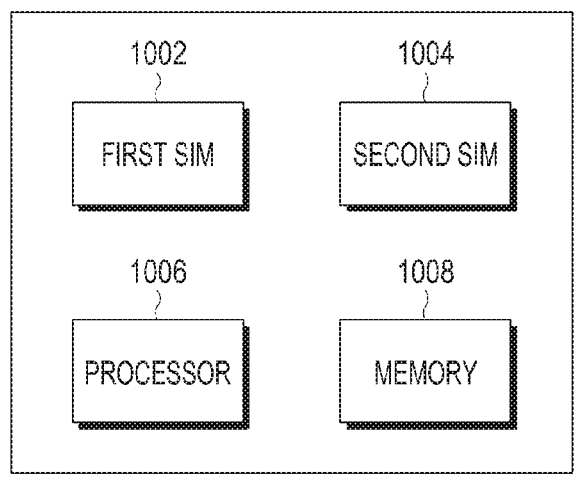
FIG. 10 is a schematic block diagram of a multi-SIM wireless device, according to an embodiment of the present disclosure.

FIG. 10 is a schematic block diagram of a multi-SIM wireless device, according to an embodiment of the present disclosure. According to the disclosure, the multi-SIM wireless device can be of dual SIM dual standby (DSDS) device such as, but not limited to, mobile phone, PDA, tablet, and the like. The multi-SIM wireless device in FIG. 10 includes a first SIM 1002, a second SIM 1004, a processor 1006, and a memory module 1008.

According to the embodiment, the first SIM 1002 and the second SIM 1004 allow the user to access one or more networks at the same time. The multi-SIM wireless device has a single radio, and thus both the first SIM 1002 and the second SIM 1004 accesses the same radio when accessing a network.

Processor 1006 in the multi-SIM wireless device executes instructions related to the first SIM 1002 and the second SIM 1004. Memory module 1008 can be a non-transitory machine-readable memory adapted to store instructions which when executed by the processor cause the device to initiate a call to a party of a first user group stored in the first SIM, check if a call can be established using the first SIM or not, if the call cannot be established using the first SIM, invoke a calling line identification restriction (CLIR) supplementary service for the second SIM, and establish the call using the second SIM, wherein the calling line identity of the second SIM is not displayed on the called party's device.

The embodiments described herein are specific examples; it will be evident to one of ordinary skill in the art that various modifications and changes may be made to these embodiments without departing from the broader spirit and scope of the present disclosure. Furthermore, the various devices, modules, and the like described herein may be enabled and operated using hardware circuitry, such as, for example, complementary metal oxide semiconductor (CMOS) based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of managing multiple subscriber identities in a multi-subscriber identity module (multi-SIM) device, comprising:
    initiating, by the multi-SIM device, a call to a first party of a first user group stored in a first SIM of the multi-SIM device;
    determining, by the multi-SIM device, whether the call to the first party stored in the first SIM can be established using the first SIM; and
    if the call to the first party stored in the first SIM cannot be established using the first SIM:
        invoking, by the multi-SIM device, a calling line identification restriction (CLIR) supplementary service for a second SIM of the multi-SIM device, wherein the first party does not belong to a second user group stored in the second SIM; and
        establishing, by the multi-SIM device, the call to the first party stored in the first SIM using the second SIM,
    wherein a second calling line identity (ID) differs from a first calling line ID associated with the first SIM, and the second calling line ID associated with the second SIM is not displayed on a terminal of the first party.

2. The method of claim 1, further comprising:
    if the call can be established using the first SIM, establishing the call to the first party stored in the first SIM using the first SIM; and
    displaying the first calling line ID associated with the first SIM on the multi-SIM device.

3. The method of claim 1, wherein the CLIR supplementary service is invoked either by prefixing a code string to dialed digits or based on network operator specifications.

4. The method of claim 1, wherein establishing the call to the first party stored in the first SIM using the second SIM comprises:
    setting, by the multi-SIM device, a user-user information element (UUI) to a username to be shared with the first party;
    initiating the call to the first party stored in the first SIM using the second SIM;
    activating a connected line presentation restriction (COLR) supplementary service for the second SIM;
    sending the UUI in a setup protocol message in a call origination sequence; and
    establishing the call to the first party stored in the first SIM using implicit activation of a user-to-user signaling (UUS) service,
    wherein the username is extracted and displayed on the terminal of the first party without providing the second calling line ID associated with the second SIM or the username is displayed with a mobile station international subscriber directory number (MSISDN) of the first SIM as extracted using UUS information.

5. The method of claim 1, wherein establishing the call to the first party stored in the first SIM using the second SIM comprises:
    activating a connected line presentation restriction (COLR) supplementary service for the second SIM;
    forwarding calls from the first SIM to the second SIM before attempting the call to the first party stored in the first SIM using the second SIM; and
    establishing the call to the first party stored in the first SIM with the first party of the first user group without displaying the second calling line ID associated with the second SIM on the terminal of the first party even if the first party is registered for connected line identification presentation (COLP) services.

6. The method of claim 5, wherein the COLR service is activated by either of prefixing a code string specified by a network operator to the dialed digits or a network operator specific procedure.

7. The method of claim 5, further comprising:
    receiving a call from a second party of a second user group stored in the first SIM during the established call to the first party stored in the first SIM;
    putting, by the multi-SIM device, the established call to the first party stored in the first SIM on hold;
    invoking a user-to-user signaling 2 (UUS2) service using a facility protocol message;
    sharing a username with the second party using an user information protocol message; and
    receiving, by the multi-SIM device, the call to the first party stored in the first SIM from the second party,
    wherein the username received in the user information protocol message is displayed on a terminal of the second party without displaying the second calling line ID associated with the second SIM if the second SIM or the username is displayed with a mobile station international subscriber directory number (MSISDN) of the first SIM.

8. A multi-subscriber identity module (multi-SIM) wireless communication device, comprising:
    a plurality of SIMs, including a first SIM and a second SIM;
    a processor; and
    a non-transitory machine-readable memory adapted to store instructions which when executed by the processor cause the device to:
        initiate a call to a first party of a first user group stored in the first SIM;
        determine whether the call to the first party stored in the first SIM can be established using the first SIM;
        if the call to the first party stored in the first SIM cannot be established using the first SIM, invoke a calling line identification restriction (CLIR) supplementary service for the second SIM, wherein the first party does not belong to a second user group stored in the second SIM, and establish the call to the first party stored in the first SIM using the second SIM,
    wherein a second calling line identity (ID) differs from a first calling line ID associated with the first SIM, and the second calling line ID associated with the second SIM is not displayed on a terminal of the first party.

9. The multi-SIM wireless communication device of claim 8, wherein the instructions when executed by the processor further cause the device to:
    if the call to the first party stored in the first SIM can be established using the first SIM, establish the call to the first party stored in the first SIM using the first SIM; and display the first calling line ID associated with the first SIM on the multi-SIM device.

10. The multi-SIM wireless communication device of claim 8, wherein the CLIR supplementary service is invoked by either of prefixing a code string to dialed digits or based on network operator specifications.

11. The multi-SIM wireless communication device of claim 8, wherein establishing the call to the first party stored in the first SIM using the second SIM comprises:
    setting a user-user information element (UUI) to a username to be shared with the first party;
    initiating the call to the first party stored in the first SIM using the second SIM;
    activating a connected line presentation restriction (COLR) supplementary service for the second SIM;
    sending the UUI in a setup protocol message in a call origination sequence; and
    establishing the call to the first party stored in the first SIM using implicit activation of a user-to-user signaling (UUS) service,
    wherein the username is extracted and displayed on the terminal of the first party without providing a second calling line ID associated with the second SIM or the username is displayed with a mobile station international subscriber directory number (MSISDN) of the first SIM as extracted using UUS information.

12. The multi-SIM wireless communication device of claim 8, wherein the instructions when executed by the processor further cause the device to:
    activate a connected line presentation restriction (COLR) supplementary service for the second SIM;
    forward calls from the first SIM to the second SIM before attempting the call to the first party stored in the first SIM using the second SIM; and
    establish the call to the first party stored in the first SIM with the first party of the first user group without displaying the second calling line ID associated with the second SIM on the terminal of the first party even if the first party is registered for connected line identification presentation (COLP) services.

13. The multi-SIM wireless communication device of claim 12, wherein the COLR service is activated either by prefixing a code string specified by a network operator to the dialed digits or a network operator specific procedure.

14. The multi-SIM wireless communication device of claim 12, wherein the instructions when executed by the processor further cause the device to:
    receive a call from a second party of a second user group stored in the first SIM during the established call to the first party stored in the first SIM;
    put the established call to the first party stored in the first SIM on hold;
    invoke a user-to-user signaling 2 (UUS2) service using a facility protocol message;
    share a username with the second party using an user information protocol message; and
    receive the call from the second party,
    wherein the username received in the user information protocol message is displayed on a terminal of the second party without displaying the second calling line ID associated with the second SIM if the second SIM or the username is displayed with a mobile station international subscriber directory number (MSISDN) of the first SIM.

15. A wireless communication device, comprising:
    a plurality of slots, each capable of receiving a subscriber identity module (SIM);
    a processor; and
    a non-transitory machine-readable memory which stores instructions which when executed by the processor cause the device to:
    initiate a call to a first party stored in a first SIM inserted into a slot;
    determine whether the call to the first party stored in the first SIM can be established using the first SIM;
    if the call to the first party stored in the first SIM cannot be established using the first SIM, invoke a calling line identification restriction (CLIR) supplementary service for a second SIM inserted into another slot, wherein the first party does not belong to a second user group stored in the second SIM, and establish the call to the first party stored in the first SIM using the second SIM,
    wherein a second calling line identity (ID) differs from a first calling line ID associated with the first SIM, and the second calling line ID associated with the second SIM is not displayed on a terminal of the first party.

16. The device of claim 15, wherein the called party is registered for connected line identification presentation (COLP) services.

17. The device of claim 15, wherein establishing the call to the first party stored in the first SIM using the second SIM comprises:
    setting a user-user information element (UUI) to a username to be shared with the called party;
    initiating the call to the first party stored in the first SIM using the second SIM;
    activating a connected line presentation restriction (COLR) supplementary service for the second SIM;
    sending the UUI in a setup protocol message in a call origination sequence of the call to the first party stored in the first SIM using the second SIM; and
    establishing the call to the first party stored in the first SIM using implicit activation of a user-to-user signaling (UUS) service,
    wherein the username and/or a mobile station international subscriber directory number (MSISDN) of the first SIM is displayed on the terminal of the first party based on information provided in accordance with the activated COLR service.

18. The device of claim 15, wherein the instructions when executed by the processor further cause the device to:
    activate a connected line presentation restriction (COLR) supplementary service for the second SIM;
    forward calls from the first SIM to the second SIM before attempting the call to the first party stored in the first SIM using the second SIM; and
    establish the call to the first party stored in the first SIM with the first party of the first user group without displaying the second calling line ID associated with the second SIM on the terminal of the first party even if the first party is registered for connected line identification presentation (COLP) services.

19. The device of claim 18, wherein the COLR service is activated by either of prefixing a code string specified by a network operator to the dialed digits or a network operator specific procedure.

20. The device of claim 18, wherein the instructions when executed by the processor further cause the device to:
    receive a call from a second party of a second user group stored in the first SIM during the established call to the first party stored in the first SIM;
    put the established call to the first party stored in the first SIM on hold;

invoke a user-to-user signaling 2 (UUS2) service using a facility protocol message;

share a username with the second party using an user information protocol message; and receive the call form the second party, wherein the username received in the user information protocol message is displayed on a terminal of the second party without displaying the second calling line ID associated with the second SIM if the second SIM or the username is displayed with a mobile station international subscriber directory number (MSISDN) of the first SIM.

* * * * *